United States Patent
Larsson

(10) Patent No.: US 10,459,752 B2
(45) Date of Patent: Oct. 29, 2019

(54) HYBRID REMOTE DESKTOP LOGON

(71) Applicant: VMware, Inc., Palo Alto, CA (US)

(72) Inventor: Per Olov Larsson, London (GB)

(73) Assignee: VMware, Inc., Palo Alto, CA (US)

( * ) Notice: Subject to any disclaimer, the term of this patent is extended or adjusted under 35 U.S.C. 154(b) by 134 days.

(21) Appl. No.: 15/648,433

(22) Filed: Jul. 12, 2017

(65) Prior Publication Data

US 2019/0018697 A1    Jan. 17, 2019

(51) Int. Cl.
| | | |
|---|---|---|
| G06F 9/455 | (2018.01) | |
| G06F 9/451 | (2018.01) | |
| G06F 21/41 | (2013.01) | |
| H04L 29/06 | (2006.01) | |
| G06F 21/31 | (2013.01) | |

(Continued)

(52) U.S. Cl.
CPC .......... *G06F 9/45558* (2013.01); *G06F 9/452* (2018.02); *G06F 21/31* (2013.01); *G06F 21/335* (2013.01); *G06F 21/34* (2013.01); *G06F 21/41* (2013.01); *H04L 63/0807* (2013.01); *H04L 63/0815* (2013.01); *H04L 63/083* (2013.01); *H04L 63/0823* (2013.01)

(58) Field of Classification Search
CPC .......... G06F 9/45; G06F 9/452; G06F 9/4558; G06F 21/41; G06F 21/31; G06F 21/335; G06F 21/34; G06F 21/40; H04L 63/0815; H04L 63/0823; H04L 63/083; H04L 63/08–0892; H04L 9/32; H04L 63/10

See application file for complete search history.

(56) References Cited

U.S. PATENT DOCUMENTS

| | | | | |
|---|---|---|---|---|
| 2006/0174037 A1* | 8/2006 | Bernardi | ........... | H04L 29/12207 709/245 |
| 2011/0154465 A1* | 6/2011 | Kuzin | ................ | H04L 63/0815 726/9 |

(Continued)

OTHER PUBLICATIONS

Microsoft "Windows Interactive Logon Architecture" Feb. 18, 2010 http://technet.microsoft.com/en-us/library/ff404303(v=ws.10).aspx.

(Continued)

*Primary Examiner* — Khalil Naghdali
*Assistant Examiner* — Shaqueal D Wade
(74) *Attorney, Agent, or Firm* — Patterson + Sheridan, LLP

(57) ABSTRACT

A hybrid account logon is disclosed for logging into remote desktops. In one embodiment, the hybrid logon combines local and domain accounts by building a local primary access token which provides credentials for local and domain-based accounts. In one embodiment, a credentials provider creates a serialized structure including both local account information and domain credentials and sends the serialized structure to a logon user interface (UI) process. The logon UI process calls a user authentication service that itself calls a hybrid authentication package which performs a domain logon, discards any identity associated with the domain logon session, and builds a local identity for the local account. The user authentication service then generates a primary access token including the local identity and the domain logon session data, thereby supporting interactive logon based on the local user identity which is also linked to network credentials for use in accessing network resources.

20 Claims, 4 Drawing Sheets

(51) Int. Cl.
     *G06F 21/33*         (2013.01)
     *G06F 21/34*         (2013.01)

(56) References Cited

U.S. PATENT DOCUMENTS

| | | | | |
|---|---|---|---|---|
| 2011/0265172 | A1* | 10/2011 | Sharma | H04L 63/0815 |
| | | | | 726/8 |
| 2012/0204245 | A1* | 8/2012 | Ting | G06F 21/35 |
| | | | | 726/6 |
| 2012/0317630 | A1* | 12/2012 | Goldberg | H04L 9/3215 |
| | | | | 726/7 |
| 2014/0208410 | A1* | 7/2014 | Dellago, Jr. | H04L 63/0853 |
| | | | | 726/9 |
| 2016/0055017 | A1 | 2/2016 | Beveridge et al. | |
| 2016/0071094 | A1* | 3/2016 | Krishnaiah | G06Q 20/363 |
| | | | | 705/66 |

OTHER PUBLICATIONS

Microsoft "LSA Logon Sessions", 2017 https://msdn.microsoft.com/en-us/library/windows/desktop/aa378338(v=vs.85).aspx.
Microsoft "LUID structure", 2017 https://msdn.microsoft.com/en-us/library/windows/desktop/aa379261(v=vs.85).aspx.

* cited by examiner

HYBRID REMOTE DESKTOP LOGON

BACKGROUND

Remote desktop products such as VMware® Horizon View™ allow users to remotely access virtual computing desktops, and applications running thereon, that are hosted on virtual machines (VMs) running in centralized servers and are delivered as a managed service to the users via a network. Such centralized and automated management of the virtualized operating system, applications, and user data provides increased control and cost savings.

Unauthenticated, or "anonymous," logon is a feature that can permit users to connect to a remote desktop infrastructure and access remote desktops and applications without providing access credentials. For example, users at a healthcare facility may wish to access applications at different locations within the facility without having to log on at each of those locations. Although authentication is not required in unauthenticated remote desktop sessions, session isolation is still necessary to prevent users from accessing information in other users' sessions. Such session isolation may be achieved by having remote desktop users log on using different user accounts, with some information such as a template user profile being shared between accounts and other data being created and stored temporarily for each session.

In an unauthenticated remote desktop session, an application may need to access network resources, such as a file share hosted on another device or a network printer. A local logon, using an unauthenticated local account on the remote desktop host, would typically not permit such access to network resources unless the user provides additional network credentials. This requirement to provide credentials contradicts the purpose of unauthenticated access.

One solution to permitting unauthenticated remote desktop sessions access to network resources is to grant access to all users without authentication. For example, a guest account may be enabled in Microsoft Windows® that permissions resources to the "everyone" group, and, in such a case, anyone can access network resources without providing credentials. However, this approach may be undesirable for security reasons, as it creates an additional attack surface and can be used to discover information about the network environment.

Another approach is to create the same account on the network resource that is created locally on the remote desktop host. For example, the same usernames and passwords may be created on a network printer as on the remote desktop host. Operating systems such as Windows® automatically share the credentials used to log on locally with all authentication packages, including those for accessing network resources. As a result, the credentials used to log on locally could be used to access network resources on which the same account has been created. However, this approach requires the creation of the same accounts on all network devices to which access is desired and the synchronization of all the account passwords, which can be impractical.

Yet another approach is to create a set of domain accounts for accessing network resources, and to use those domain accounts rather than local accounts to log on to remote desktops. Doing so would provide unique accounts that can also be used to access network resources. However, the set of domain accounts would need to be maintained on potentially a large number of remote desktop hosts, which creates account management and overhead in ensuring a unique account is used for each session (to prevent to unauthorized access to data generated in a concurrent session if unique accounts are not used).

SUMMARY

One embodiment provides a computer-implemented method of logging on to a system using domain credentials and local user account information associated with a predefined user name. The method includes receiving local user account information and domain credentials, initiating a domain logon session using the domain credentials, generating a local user identity based on at least the local user account information, generating a token which includes the local user identity and data associated with the domain logon session, and logging on to the system using the generated token.

Further embodiments provide a non-transitory computer-readable medium that includes instructions that, when executed, enable a computer to implement one or more aspects of the above method, and a computer system programmed to implement one or more aspects of the above method.

DETAILED DESCRIPTION

Figure 1:
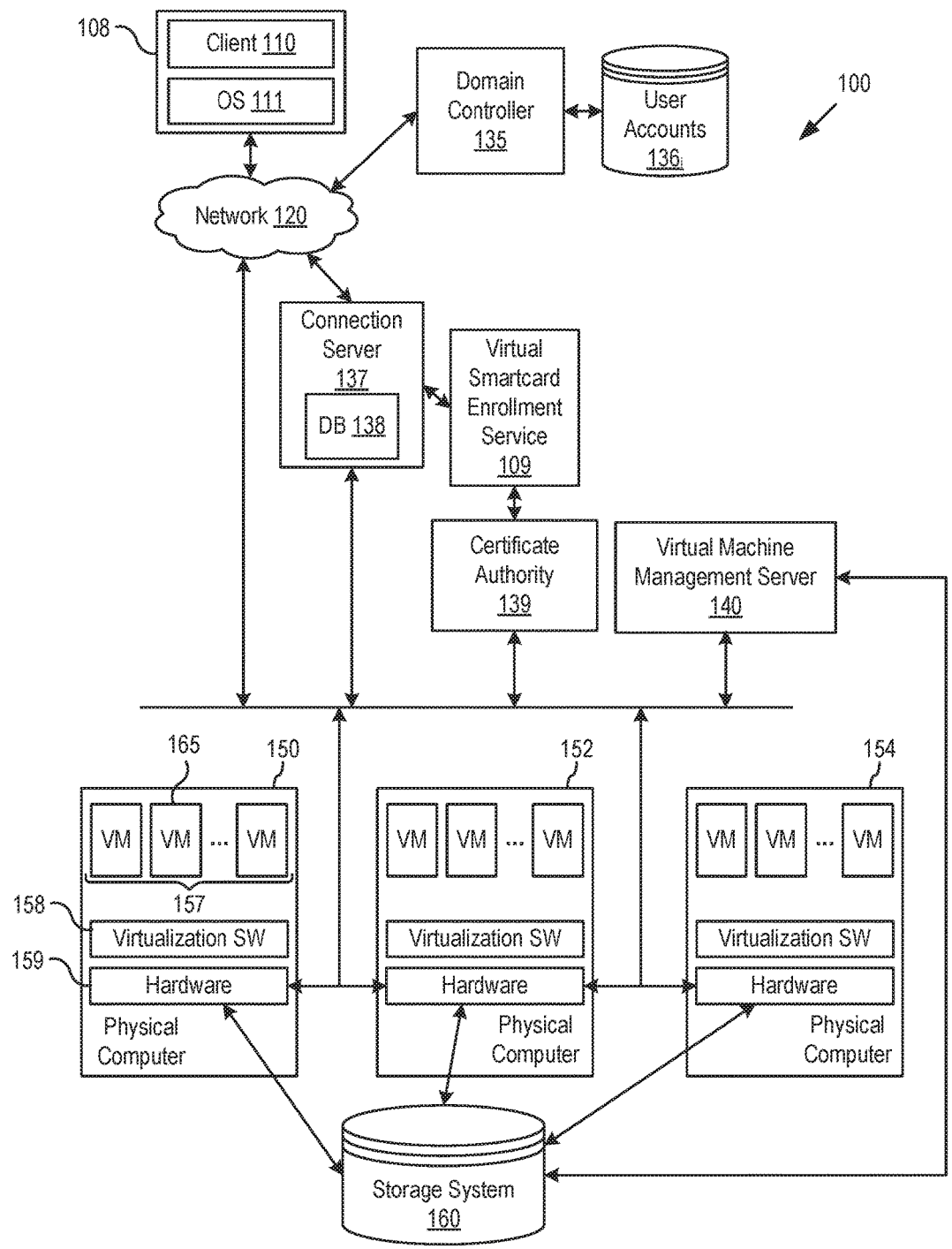
FIG. 1 illustrates components of a remote desktop system in which one or more embodiments may be implemented.

Embodiments disclosed herein relate to hybrid account logon for logging into remote desktops. In contrast to purely local or domain user accounts, the hybrid account logon combines local and domain accounts by, among other things, using a hybrid authentication package to build a local primary interactive logon token providing credentials for both local and domain-based accounts. In one embodiment, a credentials provider is configured to create a serialized structure including both local account information and domain credentials. The local account information includes a username for an available unauthenticated local account, or the username along with a password generated by an account manager. The domain credentials include either a username and password pair of an account maintained by a domain controller or virtual smartcard credentials comprising a private key, a digital certificate, and optionally, a personal identification number (PIN). During interactive logon, the credentials provider retrieves the credentials from a desktop manager, and the credentials provider then builds and sends a serialized structure including the local account information and domain credentials to a logon user interface (UI) process, which in turn calls a user authentication service and specifies use of the hybrid authentication package. After the user authentication service calls the hybrid authentication package, the hybrid authentication package checks, for security purposes, that the account manager recognizes the local account password passed to it, and thereafter it performs a domain logon by, e.g., calling a kerberos authentication package. As used herein, domain logon refers to a network logon with a user account hosted by a domain controller such as a Microsoft® active directory domain controller. By contrast, local logon is used herein to refer to logging on to a remote desktop on a remote desktop host using a local account maintained in a database of the remote desktop host. The kerberos authentication package called by the hybrid authentication package performs a domain logon to create a new network logon session (also referred to herein as a domain logon session) that is linked to a kerberos ticket-granting ticket for the domain account. Then, the hybrid authentication package may optionally discard any user identity and security group information associated with the domain logon session and build a new local identity for the local account and any relevant local security groups, which is returned along with domain logon session data such as a logon session identifier (also referred to as an "LUID") to the user authentication service. Thereafter, the user authentication service generates a new primary access token (also referred to herein as the "hybrid primary access token") which includes the local identity and the domain logon session data identifier. Such a hybrid primary access token supports an interactive logon to the remote desktop based on the local user identity, which is also linked to kerberos credentials (the kerberos ticket-granting ticked) for use in accessing network resources after the user is logged on to the remote desktop.

FIG. 1 illustrates components of a remote desktop system 100 in which one or more embodiments may be implemented. In remote desktop system 100, remote desktop client software programs (also referred to herein as "clients" for short), e.g., client 110, run on operating systems of local computing devices, e.g., client machine 108 on top of an operating system (OS) 111. Remote desktop clients provide an interface for users to access remote desktops and applications running on those desktops, which may themselves be running in one of virtual machines 157 or in blade servers (not shown) in a data center that is remote from the user locations. The term, "desktop" refers to the instance of an interactive operating environment provided by a computer operating system and software applications, typically in the form of a display and sound output and keyboard and mouse input. With remote desktop clients, users can access desktops and applications running in a remote data center through network 120, from any location, using a general purpose computer running a commodity operating system and a client software program such as VMware® View™, or a special purpose thin client such as those available from Dell, HP, NEC, Sun Microsystems, Wyse, and others.

Remote desktop system 100 includes a domain controller 135, such as Microsoft® Active Directory®, that manages user accounts 136 including user log-in information for accessing network resources. Remote desktop system 100 further includes a connection server 137 (also referred to as a "connection broker") that manages connections between remote desktop clients and remote desktops running in virtual machines 157 or other platforms, e.g., running directly on physical machines such as blade servers. More specifically, connection server 137 is configured to grant access to resources against active directory groups and publish applications, remote desktops, and/or remote shell (RSH) desktops. For purposes of unauthenticated/anonymous logon by users, connection server 137 maintains objects, in a database 138, with each object including an alias and a reference to a domain user account $136_i$ for an unauthenticated user, i.e., a mapping between an alias and an unauthenticated user account. If only one such user account is created on connection server 137 or if client 110 is configured to use only one unauthenticated user account, then an unauthenticated session may be established for client 110 using that one unauthenticated user account. If, however, there are more than one unauthenticated user account and client 110 is not configured to use any particular unauthenticated user account, then client 110 may be presented with a list of aliases that map to different unauthenticated user accounts, and the user may select one of those aliases to use in unauthenticated logon, as discussed in greater detail below.

Domain controller 135 and connection server 137 may run on separate servers or in separate virtual machines running on the same server or different servers. In the embodiments illustrated herein, desktops are running in virtual machines 157 and virtual machines 157 are instantiated on one or more physical host computers (e.g., host computers 150, 152, and 154), each of which includes virtualization software 158 and hardware 159, is controlled by a virtual machine management server 140, and is coupled to a shared persistent storage system 160. That is, a pool of virtual machines may be executed to act as remote desktop hosts that each support one or more remote desktop sessions.

As shown, remote desktop system 100 also includes a virtual smartcard enrollment server 109 that is configured to generate virtual smartcards. As used herein, a virtual smartcard is a software-based representation of a physical smartcard or authentication device that stores credentials such as a private key, a digital certificate, and optionally, a PIN that is a random number associated with the digital certificate. The digital certificate in particular may be generated by a certificate authority 137 that smartcard enrollment server 109 is in communication with. The credentials stored in the virtual smartcard may permit a user associated with the virtual smartcard to be authenticated and granted access to domain resources without having to enter a username and password. An example of such a virtual smartcard is disclosed in U.S. Pat. No. 8,782,768, entitled "Systems and Methods for Accessing a Virtual Desktop," which is incorporated by reference in its entirety herein. The virtual smartcard, including the private key, digital certificate, and (optional) PIN, may be used to perform a smartcard-based domain logon, as discussed in greater detail below.

Illustratively, the components of remote desktop system 100 communicate via network 120. For simplicity, a single network is shown but it should be recognized that, in actual implementations, the components of remote desktop system 100 may be connected over the same network or different networks. Furthermore, a particular configuration of the remote desktop system is described above and illustrated in FIG. 1, but it should be recognized that one or more embodiments may be practiced with other configurations of the remote desktop system.

Figure 2:
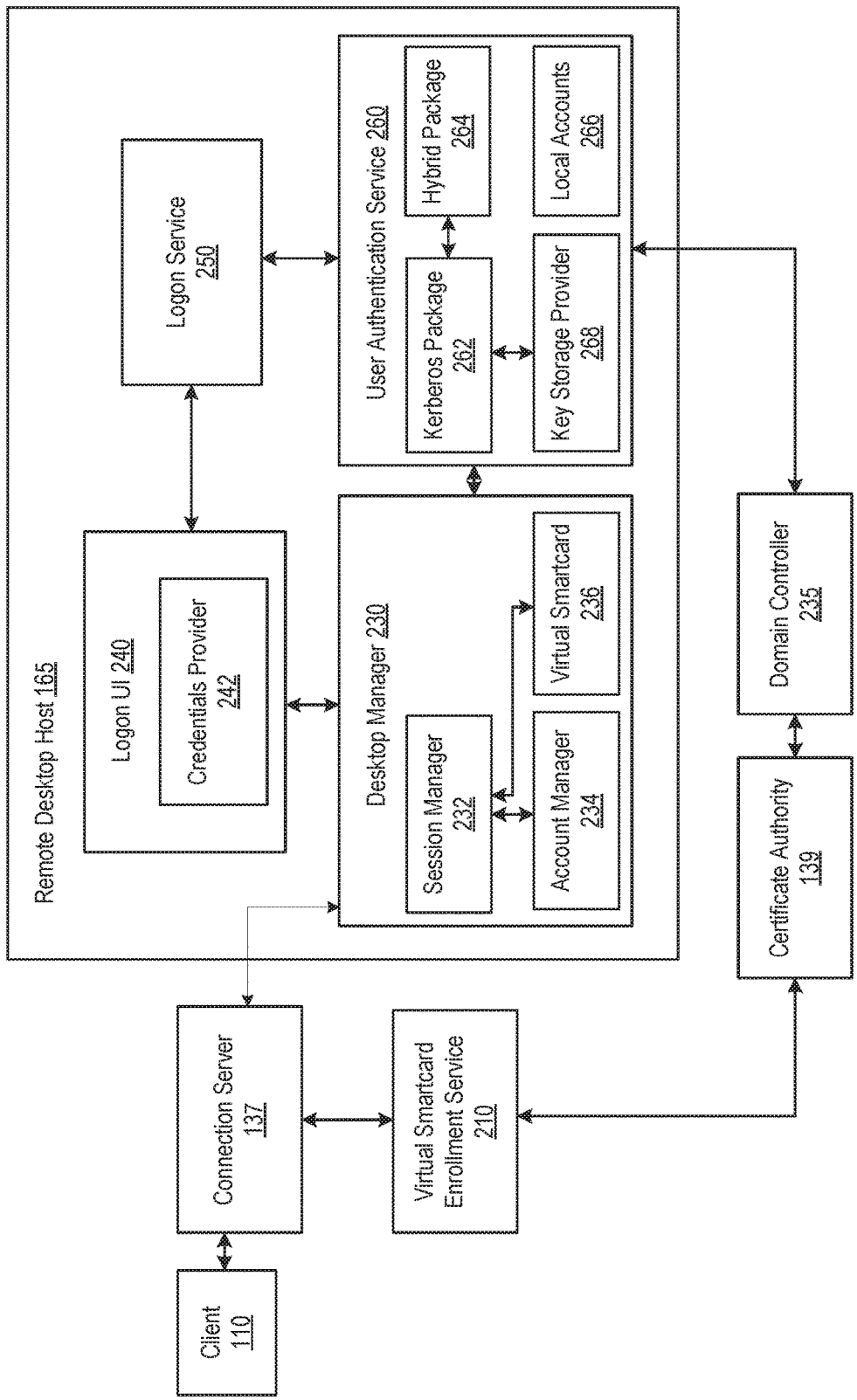
FIG. 2 illustrates in greater detail components of the remote desktop system implementing a hybrid remote desktop logon, according to an embodiment.
Figure 3:
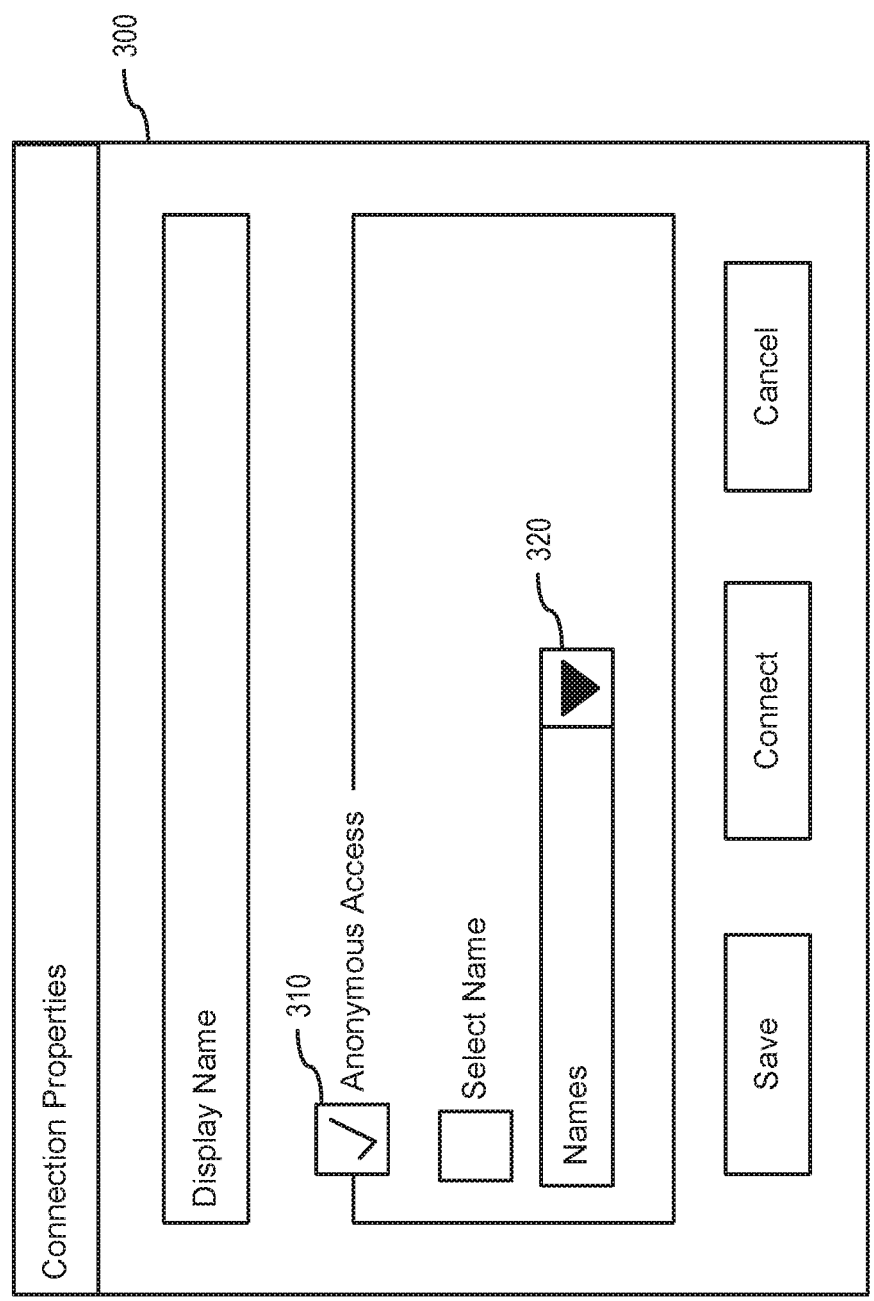
FIG. 3 illustrates an example user interface that a user may interact with to initiate an unauthenticated session logon, according to an embodiment.

FIG. 2 illustrates in greater detail components of remote desktop system 100 implementing a hybrid remote desktop logon, according to an embodiment. As shown, client 110, which is in communication with connection server 137, sends to connection server 137 a request to create an unauthenticated session to access an application. Initially, client 110 may authenticate anonymously to connection server 137 by, for example, specifying an alias used to identify an unauthenticated user account. FIG. 3 illustrates an example UI 300 that a user may interact with to choose an unauthenticated session by selecting "Anonymous Access" checkbox 310 and specifying an alias to use by selecting one of a number of names provided in a drop-down menu 320. As discussed, there may be multiple unauthenticated user accounts maintained by connection server 137, and if client 110 is not configured to use any particular unauthenticated user account, then client 110 may be presented with a list of the aliases that map to unauthenticated user accounts, and the user may then select one of those aliases to use via, e.g., the UI 300.

Returning to FIG. 2, connection server 137 maps the alias used to identify the unauthenticated user account and specified by client 110 to one of user accounts $136_i$ maintained by domain controller 135. Connection server 137 then returns to client 110 a list of applications that the user account is entitled to access. In turn, the user may select, via client 110, one of the applications in the list to launch.

Upon receiving the request to create an unauthenticated session to access an application from client 110, connection server 137 identifies an available remote desktop host, shown as remote desktop host 165, that publishes the application and that supports unauthenticated access. Although sometimes described herein with respect to such a published application, it should be understood that techniques disclosed herein are equally applicable to logging on to published application sessions and on to remote desktop sessions. Connection server 137 then sends a message to the identified host requesting the remote desktop host to start a session with unauthenticated access and providing a username and password for a domain user account $136_i$, or connection server 137 may offer virtual smartcard logon, either of which may be used for domain logon. As discussed, a virtual smartcard is a software-based representation of a physical smartcard or authentication device that stores credentials such as a private key, a digital certificate, and optionally, a PIN that is a random number associated with the digital certificate, and the credentials stored in the virtual smartcard permits a user to be authenticated and granted access to domain resources without having to enter a username and password. In one embodiment, each virtual smartcard may be associated with a domain user account in a similar manner as unauthenticated user aliases are. When virtual smartcard logon is selected, connection server 137 provides the required details to the remote desktop so that it can request the virtual smartcard credentials, and if the remote desktop is configured to support virtual smartcard logon, the remote desktop will respond with a certificate signing request to be used for the virtual smartcard logon.

In response to the message from connection server 137 to start a remote desktop session with unauthenticated access, a desktop manager 230 running in remote desktop host 165 requests an available local user account from account manager 234 and accepts the username and password of the domain user account $136_i$ if such a username and password are received from connection server 137, or alternatively generates a key pair and builds a certificate signing request if the virtual smartcard is received from connection server 137. Account manager 234 is responsible for allocating local user accounts on the remote desktop host that are available, and account manager 234 may also generate a local user account password (e.g., a random password) for security purposes to prevent rogue processes from logging on to the system, as discussed in greater detail below. Desktop manager 230 then replies to connection server 137 that the remote desktop session is ready and, optionally, returns the certificate signing request. In turn, connection server 137 responds to client 110 with details (e.g., an internet protocol (IP) address) of how to connect to remote desktop host 165 and, optionally, requests a certificate from enrollment service 109 that is then sent back to remote desktop host 165.

Client 110 subsequently connects to remote desktop host 165 using the connection details provided by connection server 137. Illustratively, remote desktop host 165 includes a logon UI process 240, a logon service 250, desktop manager 230, and a user authentication process 260. Logon UI 240 is a process that provides the logon user interface. Any feasible UI may be employed for unauthenticated logon, such as a UI that does not require any user interaction, and logon UI 240 may also be configured to not display any UI at all.

As shown, logon UI 240 includes a credentials provider 240. Credentials provider 240 may be an extension or plugin to user logon UI 240 that is registered and that logon UI 240 loads upon starting up. Credentials provider 240 includes a defined set of application programming interfaces (APIs) and callbacks that permit logon UI 240 to ask credentials provider 240 for credentials (e.g., username and password) and for credentials provider 240 to call back when it has credentials that can be used to log on. Credentials provider 240 may also request logon UI 240 to display particular UI elements, such as the UI that does not require credentials to be entered to log on. In one embodiment, during the unauthenticated logon process, credentials provider 240 is configured to request credentials to use for logging on from desktop manager 230, and desktop manager 230 responds with local user account information and either the domain account username and password or virtual smartcard certificate discussed above. Credentials provider 240 then builds a serialized structure, which may be a memory blob, that includes the local user account information for the local logon, the domain account username and password or virtual smartcard certificate for the domain logon, as well an identifier of a hybrid logon authentication package 264, and returns this serialized structure to logon UI 240. It should be understood that this serialization of two types of log on credentials, namely local account details and domain credentials such as a username and password or virtual smartcard details, is different from traditional desktop logon using one set of credentials. For example, in traditional Windows® logon, the credentials provider only serializes a username and password pair or, alternatively, details of a smartcard (e.g., the name of the smartcard reader and the PIN to use the smartcard device).

Logon UI 240 calls logon service 250 and passes to it the serialized structure including the local user account information, the domain account username and password or virtual smartcard certificate, and the identifier of the hybrid logon authentication package. Logon service 250 is responsible for logging on the user for a session. In one embodiment, logon service 250 is configured to call user authentication service 260, which is a process responsible for user authentication on OS 105, with the serialized structure generated by credentials provider 240 including the identifier of hybrid logon authentication package 264. In the case of Windows®, user authentication service 260 may be the Windows® local security authority subsystem service (LSASS). As shown, user authentication service 260 includes a kerberos authentication package 262, a hybrid authentication package 264, a local accounts database 266, and a key storage provider 268. Kerberos 262 and hybrid 264 authentication packages may be extensions or plugins to user authentication service 260 that are loaded into user authentication service 260 at its start up and are then available to be called as services. Local accounts database 266 holds properties for local user accounts. Key storage provider 268 is an interface used for virtual smartcard logon, with certificate authority 139 being responsible for generating the certificate used in the virtual smartcard logon as described above.

As discussed, the serialized structure generated by credentials provider 240 and passed to user authentication service 260 includes an identifier of hybrid authentication package 264. As a result, user authentication service 260 will call the hybrid authentication package 264 that is identified in the serialized structure. In one embodiment, hybrid authentication package 264 is configured to call kerberos authentication package 262, passing the domain logon credentials (either the username and password or the smartcard certificate logon details), and kerberos authentication package 622 then performs domain controller/kerberos logon and returns domain logon session data, which may include an ID of the logon session (e.g., an LUID) that is linked to a kerberos ticket-granting ticket, to hybrid authentication package 264. Thereafter, hybrid authentication package 264 combines the unauthenticated local user account identity from the serialized credentials with certain domain logon session data, such as the domain logon session ID, into a hybrid credentials information structure. That is, hybrid authentication package 264 uses the logon details for the local account from the serialized structure to build the appropriate identifiers for the local user and includes, in the hybrid credentials information structure, both this identity of the local user and data associated with the domain logon session returned by kerberos authentication package 262. It should be understood that in Windows®, the kerberos authentication package will return, in addition to the domain logon session, a user identity (specifically, a security ID (SID)) that the LSA service traditionally uses to build the local primary access token. In one embodiment, hybrid authentication package 264 may (optionally) discard such a user identity provided by the kerberos authentication package as well as domain groups and other properties that are returned but not required, when building the primary interactive access token. The result is a hybrid credentials information structure that includes the local user identity for the unauthenticated user, as opposed to the user identity returned by the kerberos package. As discussed, the hybrid credentials information structure also includes domain logon session data such as a logon session ID linked to a kerberos ticket-granting ticked that can be used to access network resources by, e.g., requesting service tickets from a ticket granting service to authentication new connections with those network resources.

After building the hybrid primary credentials information structure, hybrid authentication package 264 returns this information to user authentication service 260, which then generates a hybrid primary access token from the hybrid primary credentials information structure and returns the token to logon service 250. Thereafter, logon service 250 commences the logon process, which may include dismissing the logon UI, preparing the session, loading the user profile, executing logon scripts, setting up the desktop, logging the user into the system, and the like. Subsequent to logging on, applications attempting to access network resources may use the hybrid primary access token (and specifically, the domain logon session data therein that is linked to the kerberos ticket-granting ticket discussed above) to do so, without requiring the user to enter additional credentials. It should be understood that the hybrid primary access token is the same token used to logon to the system itself, and every operation performed after logging on may have the credentials of the hybrid primary access token attached. This is different from traditional local logon, in which, after the user logs on to the remote desktop, a dialog box may still be displayed requesting credentials when an application attempts to access a network resource, and a new access token is then created that includes network credentials to permit access to the network resource for a single operation (e.g., mapping a network drive to a local drive).

In one embodiment, hybrid authentication package 262 may also return domain account properties received from kerberos authentication package back to user authentication service 250, which may in turn pass these properties to logon service 250. Such properties may include paths to logon scripts assigned to the domain account and any profile path (e.g., for a mandatory profile) assigned to the domain account, among other things. Such properties may be maintained by domain controller 135 in the same manner as properties for domain accounts are maintained. For example, users logging on to unauthenticated sessions may also require access to a particular network drive, and one of the domain account properties may be a logon script that can be executed to map the network drive to a local drive. That is, properties may be assigned to domain accounts that hybrid authentication package 262 can then selectively choose to applied to local user accounts, thereby permitting an administrator to manage local user profiles by managing a single domain account and selecting properties of the domain account to also apply to the local accounts. Alternatively, hybrid authentication package 262 may simply choose to return properties from the local user account. The returned properties that are chosen by hybrid authentication package 262 are then used in the logon process when, e.g., the logon service 250 executes logon scripts and loads the user profile. After the remote desktop session is launched by logon service 250, the remote desktop host may additionally launch the application requested by client 110 in the desktop session and present such an application to client 110.

Figure 4:
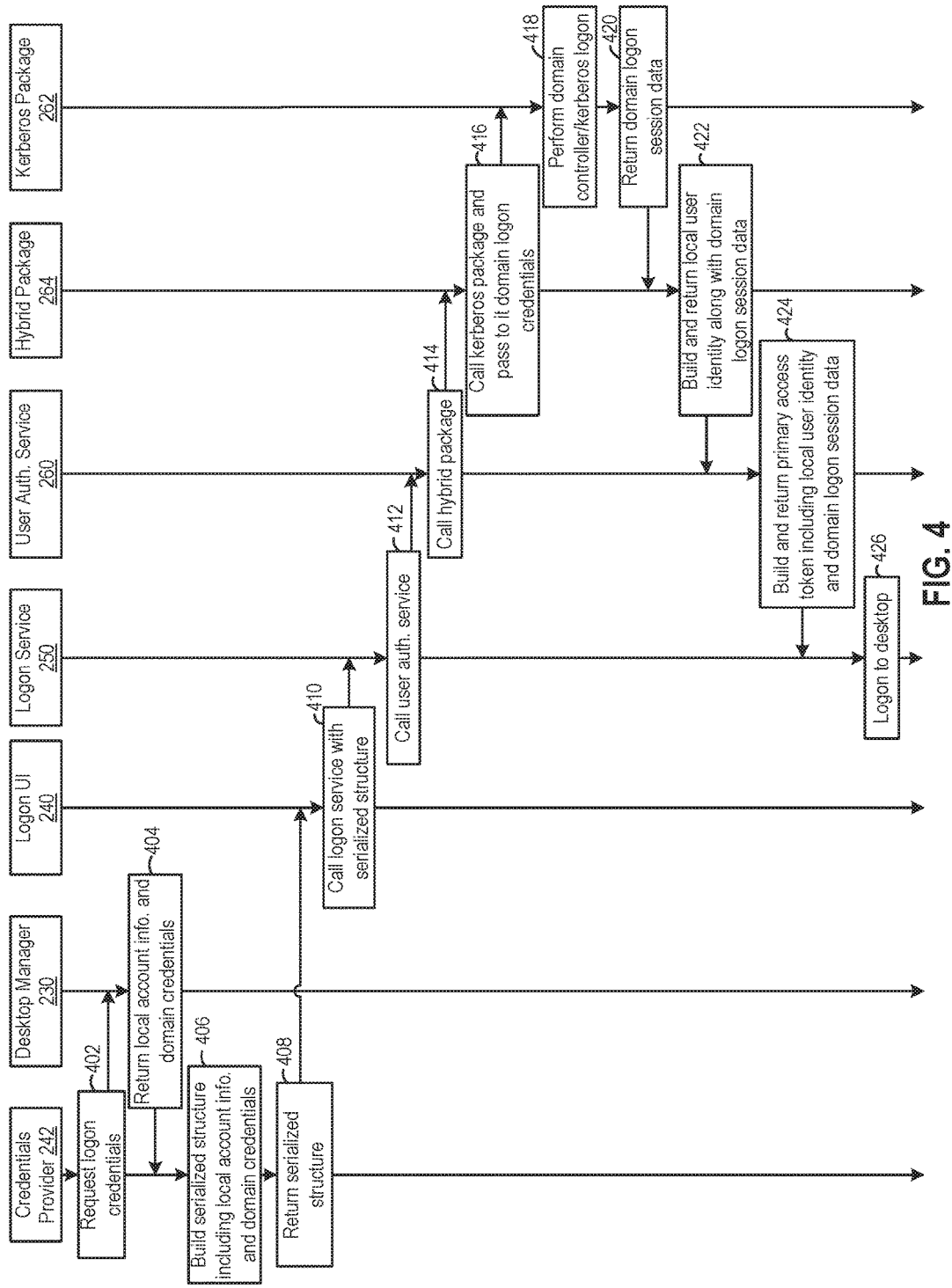
FIG. 4 is a flow diagram that illustrates a method of creating an unauthenticated remote desktop session with a hybrid logon account, according to an embodiment.

FIG. 4 is a flow diagram that illustrates a method 400 of creating an unauthenticated remote desktop session with a hybrid logon account, according to an embodiment. As shown, method 400 begins at step 402, where credential provider 242 requests logon credentials from desktop manager 230. As described, such logon credentials include a username and password of a domain user account $136_i$ that connection server 137 maps an alias provided by client 110 to or, alternatively, virtual smartcard information associated with a domain user account $136_i$, as well as details of an available local account provided by account manager 234. As a result, the local account is internally (runtime only) associated with the domain account. In one embodiment, the details of the local account include a user name for the local logon but not a password. In an alternative embodiment, account manager 234 generates a password (i.e., a secret component), such as a random password, that is then passed to credentials provider 242 and eventually to hybrid authenticate package 264. This is for security purposes, as hybrid authentication package 264 should be able to validate that it is not a rogue process that is trying to logon to the system, and this may be achieved by calling back to account manager 234, providing the password received by hybrid authentication package 264, and verifying that account manager 234 recognizes the password.

At step 404, desktop manager 230 returns the local account information (username or username and password) and domain credentials (username and password or virtual smartcard information) required for logon to credentials provider 242. Then at step 406, credentials provider 242 builds a serialized structure including the received local account information and domain credentials. In one embodiment, the serialized structure may be a memory blob including the local account information and domain account credentials, as well as an identifier of hybrid authentication package 264 as the authentication package to use for user authentication. As discussed, serializing two types of logon credentials, for both a local account and for domain logon, is different from traditional desktop logon using one set of credentials.

At step 408, credentials provider 242 returns the serialized structure to logon UI 240. Then, at step 410, logon UI 240 commences logging on the user by calling logon service 250 with the serialized structure. In turn, logon service 250 calls user authentication service 260 at step 412, which then calls hybrid authentication package 264 at step 414, as the hybrid authentication package 264 is identified in the serialized structure.

At step 416, hybrid authentication package 264 performs domain logon by calling kerberos authentication package 262, passing to it the domain logon credentials, which as discussed may either be a username and password or virtual smartcard certificate details. As previously noted, hybrid authentication package 264 may also first validate that a rogue process is not trying to logon to the system by calling back to account manager 234, providing a received password, and continuing (by calling the kerberos authentication package 262, etc.) only if account manager 234 replies that it recognizes the password as a password that account manager 234 generated. Further, it should be understood that in Windows®, the kerberos authentication package is traditionally not called directly by another authentication package but is instead called through the LSA service using APIs provided by the LSA service. However, in such a case, the kerberos authentication package will return to the LSA service which then builds an access token with the user identity provided by the kerberos authentication package. To prevent the LSA from building such an access token, hybrid authentication package 264 is configured to call the kerberos authentication package directly, to (optionally) discard the user identity provided by the kerberos authentication package (as well as domain groups and other properties that are not required), and to return the local user identity of the unauthenticated user along with the domain logon session data provided by the kerberos authentication package (in, e.g., the hybrid credentials information structure described above) so that a hybrid primary access token including the local user identity and the domain logon session data can be built.

At step 418, kerberos authentication package 262 performs domain controller/kerberos logon using the domain logon credentials provided by hybrid authentication package 264. As discussed, the credentials themselves may include either username and password or virtual smartcard certificate details, and techniques are known for performing domain logon using such credentials. For example, kerberos authentication package 262 may be the kerberos package provided by Windows® to perform domain logon in one embodiment. If the domain logon is successful, kerberos authentication package 262 will create a logon session linked to a kerberos ticket-granting ticket and store the logon session within user authentication service 260 as an object. Data associated with the domain logon, such as the kerberos ticket-granting ticket, may be attached to the object.

After the domain controller/kerberos logon, kerberos authentication package 262 returns to hybrid authentication package 264 the domain logon session data at step 420. As discussed the data associated with the domain logon may include a domain logon session ID, which is linked to the kerberos credentials (the ticket-granting ticket) that can be used to access network resources. More specifically, the kerberos ticket-granting ticket may be used to request a service ticket from a ticket granting service that issues such service tickets, and the service ticket may then be used to authenticate a connection to the network resource.

At step 422, hybrid authentication package 264 builds identifiers for the local user using the logon information for the local user account and returns the local user identity along with the domain logon session data to user authentication service 260. As discussed, hybrid authentication package 264 may also (optionally) discard user identity data provided by kerberos authentication package 262 (as well as domain groups and other properties that are not required), as hybrid authentication package is configured to build identifiers of the local unauthenticated user instead and return the local user identity of the unauthenticated user along with the domain logon session data provided by kerberos authentication package 262.

In one embodiment, hybrid authentication package 264 may also return to user authentication service 260 domain user account $136_i$ properties such as paths to logon scripts assigned to the domain account and/or any profile path (if a mandatory profile is used) assigned to the domain account that are retrieved by kerberos authentication package 262. Alternatively, hybrid authentication package 264 may return these properties from the local user account.

At step 424, user authentication service 260 generates and returns a primary interactive access token which includes the identity of the local user and the domain logon session data returned from hybrid authentication package 264. For example, in Windows®, the hybrid primary access token that is generated may include a SID for the local user and an ID of the domain logon session.

At step 426, logon service 250 logs on to the remote desktop by dismissing the logon UI; preparing a session; loading the user profile; executing any logon scripts such as domain-based logon scripts used to connect to network-based printers, file shares, etc.; setting up the desktop; and logging the user into the system, among other things. Once the remote desktop is launched, the remote desktop host may also launch an application requested by client 110. As discussed, the hybrid primary access token including the local user identity and the domain logon session data is used to logon to the system itself, and every operation performed thereafter may have the credentials of the hybrid primary access token attached. This is different from traditional local logon in which, after the user logs on to the remote desktop, a dialog box may still be displayed requesting credentials when an application attempts to access a network resource so that a new access token can be created that permits access to the network resource for a single operation (e.g., mapping a network drive to a local drive).

Although discussed herein primarily with respect to unauthenticated logon, techniques disclosed herein may also be combined with authenticated logon in some embodiments. For example, the credentials provider may be configured to display a user interface (in the purely unauthenticated logon case, no such user interface needs to be displayed) that allows the user to enter a local user-account and a password, or select an unauthenticated logon. If the user inputs the local user-account and a password, the user-input credentials may be serialized and sent to the hybrid authenticate package to process the logon. As part of the serialized structure, a property may be set specifying the logon type, indicating to the hybrid authentication package that this is a different type of hybrid logon than the unauthenticated logon. In such a case, when the hybrid authentication package processes the logon, it may first validate the local user/password, and if the validation is successful, the hybrid authentication package may look up a locally stored and encrypted set of domain credentials associated with the local account and use such domain credentials to perform a Kerberos logon in the same manner as the unauthenticated hybrid logon described above. The domain credentials may also be shared by multiple local users and would require an administrator to pre-configure the domain credentials and store them in a secure manner on the local system.

Advantageously, techniques disclosed herein permit a user to logon locally to a remote desktop using a hybrid logon and seamlessly access network resources. Hybrid accounts can be created on demand, with account allocation localized to remote desktop hosts, on which the hybrid accounts can also be managed. Further, techniques disclosed provide the choice between a virtual smartcard logon and the typical username and password kerberos logon. In addition, techniques disclosed herein permit management of the user environment on the domain level by applying domain account properties to the local logon. For example, a domain-based user profile assigned to a domain account can be applied to a local account.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operation system in which at least one application runs. It should be noted that these embodiments may also apply to other examples of contexts, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespace and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

I claim:

1. A computer-implemented method of logging on to a system using domain credentials and local user account information, comprising:

initiating a domain logon session using the domain credentials;
generating a local user identity based on at least the local user account information, wherein the local user account information includes (i) a username associated with an available unauthenticated account, or (ii) a username associated with an available unauthenticated account and password combination;
generating a token which includes the generated local user identity and data associated with the initiated domain logon session; and
logging on to the system using the generated token.

2. The method of claim 1, further comprising, discarding a domain user identity generated as part of initiating the domain logon session.

3. The method of claim 1, further comprising, applying one or more properties associated with a domain user account during the logging on to the system.

4. The method of claim 1, wherein:
the domain credentials include one of a username and password or a virtual smartcard.

5. The method of claim 4, wherein:
the local user account information further includes a password generated by an account manager; and
the method further includes verifying the generated password with the account manager.

6. The method of claim 1, wherein a user is not required to enter authentication credentials.

7. The method of claim 6, wherein:
an alias selected by the user is mapped to a domain user account; and
the domain user account is mapped to the local user account.

8. The method of claim 1, wherein the data associated with the domain logon session includes a session identifier (ID) linked to a kerberos ticket-granting ticket.

9. The method of claim 1, wherein initiating the domain logon session includes calling a kerberos authentication service without calling a user authentication service which the kerberos authentication service is an extension for.

10. The method of claim 1, further comprising, launching an application which uses the token to access network resources.

11. A non-transitory computer-readable medium comprising instructions executable by a computer, the computer having one or more physical central processing units (CPUs), wherein the instructions, when executed, cause the computer to perform operations for logging on to a system using domain credentials and local user account information, the operations comprising:
initiating a domain logon session using the domain credentials;
generating a local user identity based on at least the local user account information, wherein the local user account information includes (i) a username associated with an available unauthenticated account, or (ii) a username associated with an available unauthenticated account and password combination;
generating a token which includes the generated local user identity and data associated with the initiated domain logon session; and
logging on to the system using the generated token.

12. The computer-readable medium of claim 11, the operations further comprising, discarding a domain user identity generated as part of initiating the domain logon session.

13. The computer-readable medium of claim 11, the operations further comprising, applying one or more properties associated with a domain user account during the logging on to the system.

14. The computer-readable medium of claim 11, wherein:
the domain credentials include one of a username and password or a virtual smartcard.

15. The computer-readable medium of claim 14, wherein:
the local user account information further includes a password generated by an account manager; and
the operations further comprise verifying the generated password with the account manager.

16. The computer-readable medium of claim 11, wherein a user is not required to enter authentication credentials.

17. The computer-readable medium of claim 16, wherein:
an alias selected by the user is mapped to a domain user account; and
the domain user account is mapped to the local user account.

18. The computer-readable medium of claim 11, wherein initiating the domain logon session includes calling a kerberos authentication service without calling a user authentication service which the kerberos authentication service is an extension for.

19. The computer-readable medium of claim 11, the operations further comprising, launching an application which uses the token to access network resources.

20. A system, comprising:
a processor; and
a memory, wherein the memory includes a program for logging on to a system using domain credentials and local user account information, the program being configured to perform operations comprising:
initiating a domain logon session using the domain credentials,
generating a local user identity based on at least the local user account information, wherein the local user account information includes (i) a username associated with an available unauthenticated account, or (ii) a username associated with an available unauthenticated account and password combination,
generating a token which includes the generated local user identity and data associated with the initiated domain logon session, and
logging on to the system using the generated token.

* * * * *